US012556589B2

(12) United States Patent
Chen et al.

(10) Patent No.: US 12,556,589 B2
(45) Date of Patent: Feb. 17, 2026

(54) MEDIA RESOURCE OPTIMIZATION

(71) Applicant: Nokia Solutions and Networks Oy, Espoo (FI)

(72) Inventors: Xu Chen, Qingdao (CN); Maridi Makaraju, Austin, TX (US); Derek Underwood, Addison, TX (US)

(73) Assignee: Nokia Solutions and Networks Oy, Espoo (FI)

( * ) Notice: Subject to any disclaimer, the term of this patent is extended or adjusted under 35 U.S.C. 154(b) by 165 days.

(21) Appl. No.: 17/641,846

(22) PCT Filed: Sep. 24, 2019

(86) PCT No.: PCT/CN2019/107467
§ 371 (c)(1),
(2) Date: Mar. 10, 2022

(87) PCT Pub. No.: WO2021/056172
PCT Pub. Date: Apr. 1, 2021

(65) Prior Publication Data
US 2022/0394064 A1 Dec. 8, 2022

(51) Int. Cl.
*H04L 65/1023* (2022.01)
*H04L 12/66* (2006.01)
(Continued)

(52) U.S. Cl.
CPC ............ *H04L 65/103* (2013.01); *H04L 12/66* (2013.01); *H04L 49/25* (2013.01); *H04L 49/35* (2013.01);
(Continued)

(58) Field of Classification Search
CPC ......... H04L 12/66; H04L 49/25; H04L 49/35; H04L 61/2503; H04L 65/1016;
(Continued)

(56) References Cited

U.S. PATENT DOCUMENTS 10,469,542 B2 * 11/2019 Bollapalli ........... H04L 65/1016
2002/0010799 A1    1/2002 Kubota et al.
(Continued)

FOREIGN PATENT DOCUMENTS

CN    101730998 A    6/2010
CN    102187698 A    9/2011

OTHER PUBLICATIONS

"3rd Generation Partnership Project; Technical Specification Group Core Network and Terminals; Optimal media routeing within the IP Multimedia Subsystem (IMS); Stage 3 (Release 15)", 3GPP TS 29.079, V15.0.0, Jun. 2018, pp. 1-90.
(Continued)

*Primary Examiner* — Thomas J Dailey
(74) *Attorney, Agent, or Firm* — Tong, Rea, Bentley & Kim, LLC (57) ABSTRACT

An apparatus includes a transceiver to support a media flow involving a user equipment and an Internet Protocol (IP) Multimedia Subsystem (IMS) network that are connected via a media path that traverses a first realm associated with the user equipment, a second realm, and a third realm associated with the IMS network. In some cases, the apparatus includes a processor to establish a first context to perform interworking between the first realm and the second realm in response to an offer message from the user equipment. The processor later de-allocates the first context in response to receiving an answer message indicating that a second context performs interworking between the first realm and the third realm. In other cases, the processor bypasses allocation of a context to perform interworking between the second realm and the third realm in response to an indication that the media flow is anchored on an incoming side.

17 Claims, 8 Drawing Sheets

(51) Int. Cl.
*H04L 49/25* (2022.01)
*H04L 49/35* (2022.01)
*H04L 61/2503* (2022.01)
*H04L 65/1016* (2022.01)
*H04L 65/1104* (2022.01)
*H04W 80/10* (2009.01)

(52) U.S. Cl.
CPC ...... *H04L 61/2503* (2013.01); *H04L 65/1016* (2013.01); *H04L 65/1023* (2013.01); *H04L 65/1104* (2022.05); *H04W 80/10* (2013.01)

(58) Field of Classification Search
CPC .............. H04L 65/1023; H04L 65/103; H04L 65/1104; H04W 80/10
See application file for complete search history.

(56) References Cited

U.S. PATENT DOCUMENTS

| | | |
|---|---|---|
| 2002/0126667 A1 | 9/2002 | Oguchi |
| 2007/0213078 A1 | 9/2007 | Shaheen |
| 2009/0010270 A1 | 1/2009 | Ejzak |
| 2010/0098093 A1 | 4/2010 | Ejzak |
| 2013/0121255 A1* | 5/2013 | Wang ................. H04L 65/1095 370/328 |
| 2015/0172349 A1* | 6/2015 | Gonzalez De Langarica ............. H04L 65/65 709/219 |

OTHER PUBLICATIONS

"3rd Generation Partnership Project; Technical Specification Group Core Network and Terminals; IP multimedia call control protocol based on Session Initiation Protocol (SIP) and Session Description Protocol (SDP); Stage 3 (Release 16)", 3GPP TS 24.229, V16.1.0, Mar. 2019, pp. 1-1043.

"3rd Generation Partnership Project; Technical Specification Group Services and System Aspects; Support of Optimal Routeing (SOR); Service definition; Stage 1 (Release 15)", 3GPP TS 22.079, V15.0.0, Jun. 2018, pp. 1-15.

International Search Report and Written Opinion received for corresponding Patent Cooperation Treaty Application No. PCT/CN2019/107467, dated Jun. 15, 2020, 9 pages.

EP extended Search Report mailed in corresponding EP Application No. 19946728.3 on Apr. 11, 2023, 9 pages.

Chinese Search Report, Application No. 201980100726.3, Dec. 21, 2023, 11 pages.

* cited by examiner

MEDIA RESOURCE OPTIMIZATION

RELATED APPLICATION

This application claims priority to PCT Application No. PCT/CN2019/107467, filed on Sep. 24, 2019, each of which is incorporated herein by reference in its entirety.

BACKGROUND

The Internet Protocol (IP) Multimedia Subsystem (IMS) is an architectural framework for delivering IP multimedia to mobile users, such as users of smart phones or tablet computers. An IMS core network permits wireless and wireline devices to access multimedia, messaging, and voice applications and services. Several IMS standards and specifications have been promulgated by the 3rd Generation Partnership Project (3GPP). To allow the IMS network to be integrated with Internet resources, the 3GPP specifications use Internet Engineering Task Force protocols within the IMS network, such as Session Initiation Protocol (SIP) and Diameter. The SIP signaling protocol is used for creating, modifying and terminating two-party or multiparty sessions consisting of one or several media streams. A mobile device registers its IP address with a SIP registrar server within an IMS network by generating and sending a SIP request message with a REGISTER method token. Once registered, a mobile device may subsequently establish multimedia sessions via the IMS network, e.g., by transmitting an INVITE message towards the IMS core network.

SUMMARY OF EMBODIMENTS

The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

In some embodiments, an apparatus is provided. Some embodiments of the apparatus include a transceiver configured to support a media flow involving a user equipment and an Internet Protocol (IP) Multimedia Subsystem (IMS) network that are connected via a media path that traverses a first realm associated with the user equipment, a second realm, and a third realm associated with the IMS network. The apparatus also includes a processor configured to establish a first context to perform interworking between the first realm and the second realm in response to an offer message from the user equipment and to subsequently de-allocate the first context in response to receiving an answer message indicating that a second context performs interworking between the first realm and the third realm.

Some embodiments of the transceiver are configured to receive the answer message in response to the second context being configured to interwork between the first realm and the third realm.

Some embodiments of the processor are configured to generate a session description protocol (SDP) offer including second visited-realm attributes that indicate the first realm and the second real, and some embodiments of the transceiver are configured to transmit the SDP offer.

In some embodiments, the SDP offer includes information indicating at least one codec that is used to configure transcoding by the second context.

In some embodiments, the answer message is an SDP answer that includes a first visited-realm attribute indicating the first realm, a predetermined value of an instance number, and an unspecified IP address.

Some embodiments of the processor or configured to remove the first visited-realm attribute from the SDP answer before the transceiver forwards the SDP answer towards the user equipment.

In some embodiments, the interworking is performed by the second context comprises address translation between the first realm and the third realm.

Some embodiments of the processor are configured to establish the second context.

In some embodiments, an apparatus is provided. The apparatus includes a transceiver configured to support a media flow involving a user equipment and an Internet Protocol (IP) Multimedia Subsystem (IMS) network that are connected via a media path that traverses a first realm associated with the user equipment, a second realm, and a third realm associated with the IMS network. The apparatus also includes a processor configured to bypass allocation of a first context to perform interworking between the second realm and the third realm in response to an indication that the media flow is anchored on an incoming side, and wherein a second context on the incoming side performs interworking between the first realm and the third realm.

In some embodiments, the indication that the media flow is anchored on the incoming side includes at least one of a static configuration flag or an indicator that is dynamically detected in a message received by the transceiver.

In some embodiments, bypassing allocation of the first context includes skipping allocation of the first context.

Some embodiments of the processor are configured to generate a session description protocol (SDP) offer including visited-realm attributes that indicate the first realm and the third realm and some embodiments of the transceiver are configured to transmit the SDP offer towards the IMS network.

Some embodiments of the processor or configured to generate an SDP answer including a visited-realm attribute that indicates the third realm.

In some embodiments, bypassing allocation of the first context includes allocating a first context having an ingress realm equal to the first realm and an egress realm equal to the second realm in response to receiving an SDP offer including visited-realm attributes that indicate the first realm and the second realm and subsequently de-allocating the first context in response to an SDP answer received from the IMS network.

Some embodiments of the processor or configured to generate an SDP offer including information indicating the first realm, the third realm, and at least one codec and some embodiments of the processor are configured to determine whether transcoding is necessary based on an SDP answer received from the network in response to the SDP offer.

In some embodiments, the interworking performed by the second context includes address translation between the first realm and the third realm.

Some embodiments of the processor are configured to establish the second context.

In some embodiments, a method is provided. The method includes establishing a media path between a user equipment and an Internet Protocol (IP) Multimedia Subsystem (IMS) network. The media path traverses a first realm associated with the user equipment, a second realm, and a third realm associated with the IMS network. The method also includes selectively allocating one of a first context for interworking between the first realm and the second realm and a second context for interworking between the second realm and the third realm. The method further includes bypassing allocation of one of the first context and the second context so that only a single context performs interworking between the first realm and the third realm.

In some embodiments, selectively allocating and bypassing includes establishing the first context to perform interworking between the first realm and the second realm in response to an offer message from the user equipment and subsequently de-allocating the first context in response to receiving an answer message indicating that a second context performs interworking between the first realm and the third realm.

In some embodiments, selectively allocating and bypassing includes bypassing allocation of the second context to perform interworking between the second realm and the third realm in response to an indication that the media flow is anchored on an incoming side.

In some embodiments, bypassing allocation of the first context includes skipping allocation of the first context.

In some embodiments, bypassing allocation of the first context includes allocating the first context having an ingress realm equal to the first realm and an egress realm equal to the second realm in response to receiving an SDP offer including visited-realm attributes that indicate the first realm and the second realm bypassing of the allocation of the first context also includes subsequently de-allocating the first context in response to an SDP answer received from the IMS network.

In some embodiments, establishing the first context includes establishing the first context on a first gateway and establishing the second context includes establishing the second context on a second gateway.

In some embodiments, establishing the first context includes establishing the first context on a first gateway and establishing the second context includes establishing the second context on the first gateway.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

An Internet Protocol (IP) Multimedia Subsystem (IMS) network can be subdivided into multiple realms. A realm includes endpoints that communicate with other endpoints in the realm without requiring interworking functions such as address translation. Endpoints within one realm require interworking functions including address translation to communicate with endpoints in other realms. Realms therefore implement gateways (such as border gateways or transit gateways) to support inter-realm communication. In some cases, endpoints use a session description protocol (SDP) offer/answer exchange to establish a media path for a multimedia stream that is transmitted between the endpoints. The media path may traverse an arbitrary number of realms between the endpoints. If the media path crosses a boundary between two realms, the media path includes gateways that interconnect the different realms. The gateways include contexts associated with the media path and information in the contexts is used to perform interworking functions such as address translation, transcoding, and the like. For example, if a first user equipment in (or connected to) a first realm establishes a signaling path and a media path to a second user equipment in (or connected to) a second realm via an IMS core network in a third realm, contexts are instantiated in first gateways that interconnect the first realm and the third realm and second gateways that interconnect the third realm and the second realm. The media path for the multimedia stream between the first user equipment and the second user equipment therefore includes the first gateways and the second gateways.

Optimal media routing (OMR) reduces the number of media gateways needed to support the media path between two endpoints if either of the endpoints has direct access to one of the other realms on the media path. For example, an unoptimized media path between a first user equipment and a second user equipment passes through gateways in a first realm, a second realm, and a third realm if the first user equipment is connected to a visited network in the first realm, which is connected to the first user equipment's home network in the second realm via the third realm. If the second user equipment is also connected to the visited network in the first realm, OMR establishes an optimized media path between gateways (or contexts within a gateway) in the first realm. For another example, an unoptimized media path between a first user equipment and a second user equipment passes through gateways in a first realm, a second realm, and back to the first realm if the IMS core network for the first and second user equipment is located in the second realm, even if the first and second user equipment are connected to access networks in the first realm. The optimized media path generated using OMR bypasses the second realm and establishes a connection between gateways (or contexts within a gateway) in the first realm. However, conventional OMR does not optimize media resources consumed by media gateways that interconnect different realms, e.g., when an access realm and a peering realm of a session border controller (SBC) are different.

FIGS. 1-8 disclose embodiments of an OMR technique to establish a media path between a user equipment and an Internet Protocol (IP) Multimedia Subsystem (IMS) network. The user equipment is associated with a first realm and the media path supports a media flow that traverses the first realm, a second realm associated with an intermediate network, and a third realm associated with the IMS network. In conventional OMR, a first context is allocated in a first gateway to translate between the first realm and the second realm and a second context is allocated to translate between the second realm and the third realm. However, conventional OMR bypasses contexts that intervene between entities in the same realm and conventional OMR is therefore unable to optimize routes between different realms. To conserve the scarce resources that are consumed by gateways and the corresponding contexts in different realms, allocation of either the first context or the second context is bypassed so that only a single context is used to perform the translation functions between the first realm and the third realm. In some cases, allocation of a corresponding first gateway or second gateway is also bypassed, although the first context and the second context can be instantiated in a single gateway that is not bypassed. In some embodiments, the first context and the second context are also used to perform transcoding.

In some embodiments, the first context (on the originating or incoming side) is allocated to translate between the first realm and the second realm in response to receiving a session description protocol (SDP) offer. The first context is subsequently de-allocated in response to receiving an SDP answer including information indicating the first realm, e.g., in attributes of the SDP answer. In some embodiments, the first context is allocated to a first gateway in the first realm and allocation of the second context (on the outgoing side) is bypassed by skipping allocation altogether or initially allocating the second context and then de-allocating the second context. For example, allocation of the second context is skipped in response to determining that the second context (and, in some cases, a second gateway) is not required because the media path is to be anchored on the incoming side. For another example, the second context is initially allocated and subsequently de-allocated in response to an SDP offer/answer exchange indicating that the media path is to be anchored by the first context in the first realm.

Figure 1:
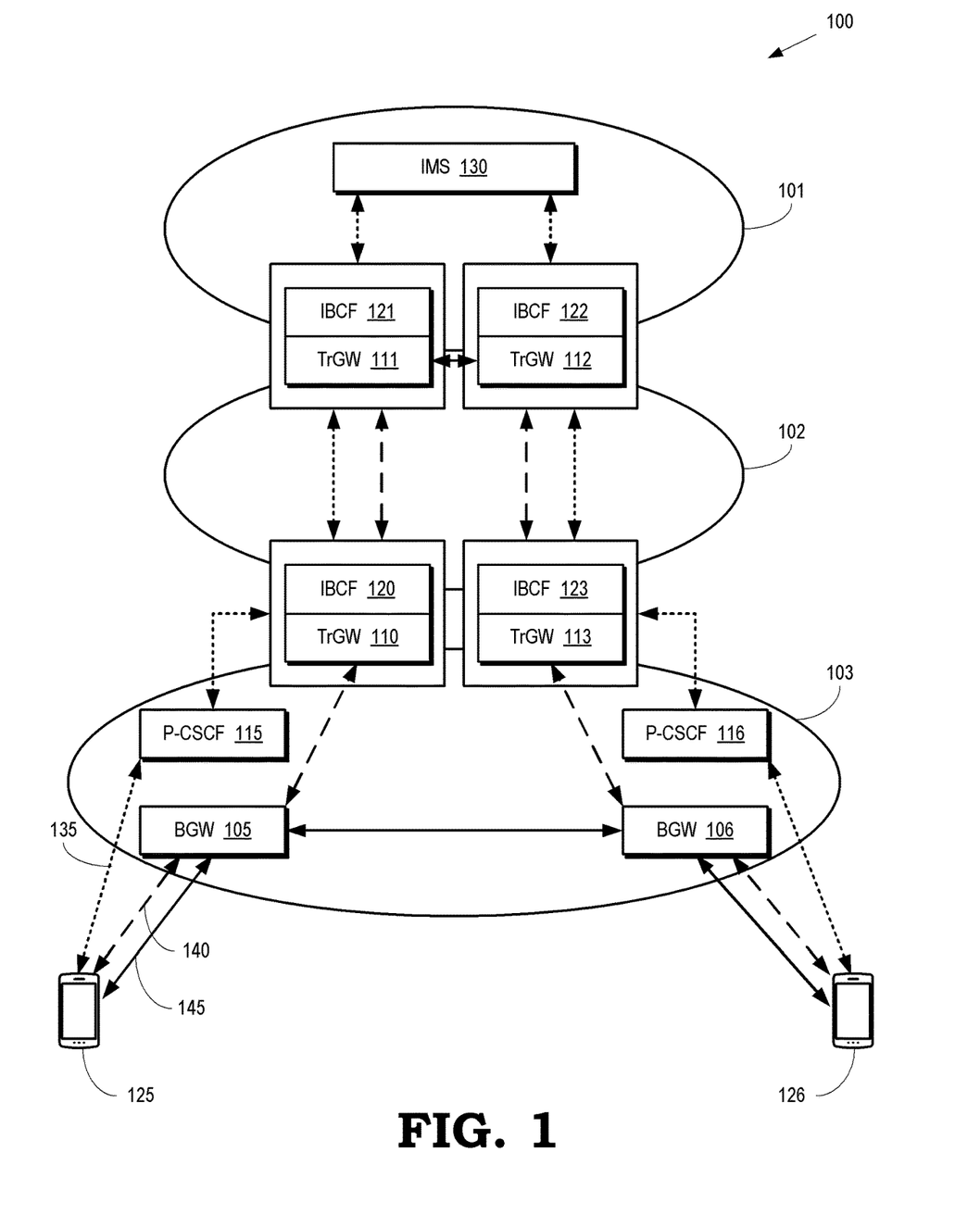
FIG. 1 is a block diagram of a communication system that implements optimal media routing (OMR) according to some embodiments.

FIG. 1 is a block diagram of a communication system 100 that implements optimal media routing (OMR) according to some embodiments. The communication system 100 operates according to IMS standards and includes multiple realms 101, 102, 103, which are collectively referred to herein as "the realms 101-103." As used herein, the term "realm" refers to a set of endpoints that communicate with other endpoints in the realm without requiring interworking functions such as address translation. Endpoints within one realm require interworking functions (including address translation) to communicate with endpoints in other realms. Interworking between the realms 101-103 is provided by gateways such as border gateways (BGWs) 105, 106 in the realm 103 and transit gateways (TrGWs) 110, 111, 112, 113, which are collectively referred to herein as "the transit gateways 110-113." The border gateways 105, 106 and the transit gateways 110-113 provide interworking functions including address translation between addresses used in the realms 110-113 and, in some embodiments, transcoding of different codecs used in the realms 110-113. The border gateways 105, 106 provide the interworking functions between a realm and an entity outside of the realm. The transit gateways 110-113 provide the interworking functions between two realms.

The communication system 100 also includes proxy call session control functions (P-CSCF) 115, 116 located in the realm 101. The P-CSCFs 115, 116 are the first point of contact for an IMS terminal. The P-CSCFs 115, 116 are also responsible for allocating or de-allocating gateways including the border gateways 105, 106 and associated contexts that provide interworking functionality. In some cases, the P-CSCF 115, 116 implement a session border controller (SBC) that performs functions such as security, network address translation traversal, transcoding, and the like. The communication system 100 also includes interconnection border control functions (IBCF) 120, 121, 122, 123, which are collectively referred to herein as "the IBCF 120-123." The IBCF 120-123 allocate or de-allocate gateways including the transit gateways 110-113.

In the illustrated embodiment, the communication system 100 provides communication pathways for media flows between user equipment 125, 126. Examples of the media flows include voice calls, video calls, streaming services, and the like. An intermediate IMS network 130 operates as a home network for the user equipment 125 and is deployed in the realm 101. The user equipment 125 is visiting (or otherwise associated with) the realm 103. In order to establish a media pathway between the user equipment 125, 126, the user equipment 125 initiates the establishment of a signaling pathway 135 (as indicated by the dotted line, double-headed arrows) from the user equipment 125, to the IMS network 130, and to the user equipment 126. An unoptimized media path 140 (as indicated by the dashed line, double-headed arrows) could be established that traverses the realms 101-103. In the illustrated embodiment, the unoptimized media path 140 includes the border gateway 105, the transit gateway gateways 110-113, and the border gateway 106. However, conventional OMR techniques can create an optimized media path 145 (as indicated by the solid line, double-headed arrows) because the user equipment 125, 126 are in (or associated with) the same realm 103. The optimized media path 145 includes the border gateways 105, 106.

Figure 2:
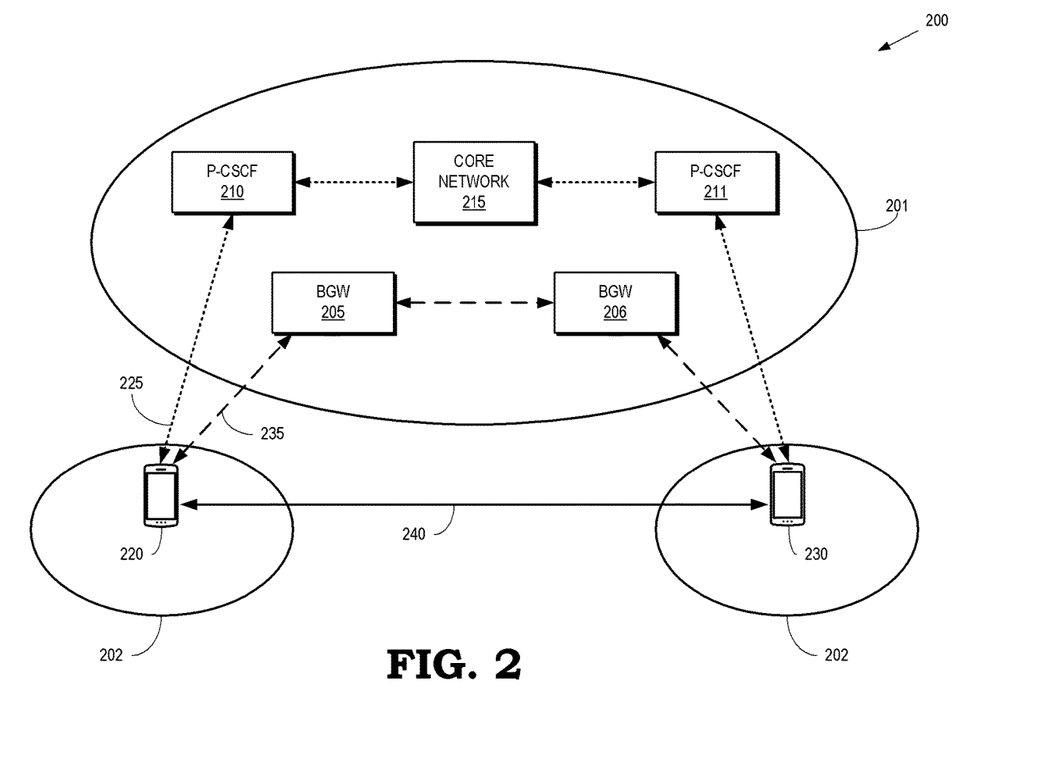
FIG. 2 is a block diagram of a communication system that implements OMR in an enterprise environment according to some embodiments.

FIG. 2 is a block diagram of a communication system 200 that implements OMR in an enterprise environment according to some embodiments. The communication system 200 operates according to IMS standards and includes realms 201, 202. The realm 202 is shown as separate ovals in the interest of clarity. The realm 201 includes border gateways 205, 206, P-CSCFs 210, 211, and a core network 215 that is implemented as an IMS network. A user equipment 220 initiates the establishment of a signaling pathway 225 (as indicated by the dotted line, double-headed arrows) from the user equipment 220 to the core network 215 and to a user equipment 230. An unoptimized media path 235 (as indicated by the dashed line, double-headed arrows) includes the border gateways 205, 206 to provide interworking functions between the realms 201, 202. Conventional OMR techniques create an optimized media path 240 (as indicated by the solid line, double-headed arrows) directly between the user equipment 220, 230 because the user equipment 220, 230 are in the same realm 202.

Thus, the conventional OMR techniques disclosed in FIGS. 1 and 2 remove unnecessary media gateways from the media path at network boundaries between realms, which reduces consumption of media plane resources as well as reducing media delay. However, the conventional OMR techniques don't implement media resource optimization for media gateways when the realms serving user equipment 220 and 230 are different.

Figure 3:
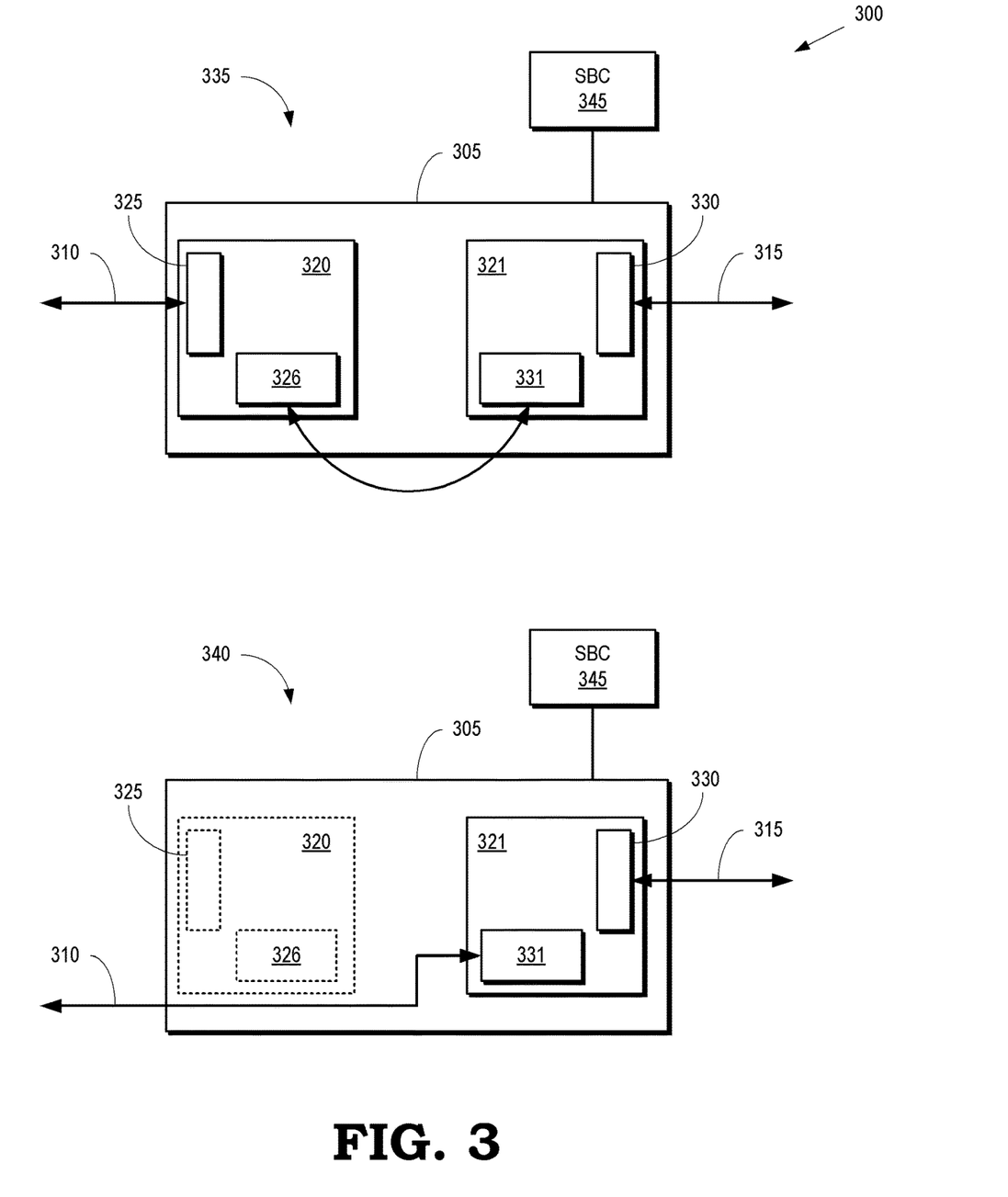
FIG. 3 is a block diagram of a media resource optimization implemented in a media gateway according to some embodiments.

FIG. 3 is a block diagram of a media resource optimization 300 implemented in a media gateway 305 according to some embodiments. The media resource optimization 300 is implemented in some embodiments of the communication system 100 shown in FIG. 1 and the communication system 200 shown in FIG. 2. The media gateway 305 provides interworking functionality between an untrusted access realm (as indicated by the double-headed arrow 310) and an untrusted peering realm (as indicated by the double-headed arrow 315). As discussed herein, the interworking functionality includes network address translation for messages exchanged between the access realm 310 and the peering realm 315 and, in some cases, transcoding between different codecs utilized in the access realm 310 and the peering realm 315.

The media gateway 305 implements a first context 320 associated with the access realm 310 and a second context 321 associated with the peering realm 315. The first context 320 includes termination points 325, 326, which function as sources of outgoing media flows from the first context 320 and sinks of incoming media flows to the first context 320. Some embodiments of the first context 320 operate according to the H.248 gateway control protocol that is used to provide communication services across a converged network such as the Internet. The second context 321 includes termination points 330, 331 that function as sources/sinks for media flows outgoing/incoming media flows for the second context 321.

The media resource optimization 300 illustrated in FIG. 3 depicts the media gateway 305 in a first, unoptimized state 335 and a second, optimized state 340. In the unoptimized state 335, the termination point 325 in the context 320 terminates media flows with the access realm 310 and the termination point 330 in the context 321 terminates media flows with the peering realm 315. The termination points 326, 331 terminate media flows between the first context 320 and the second context 321 to complete the unoptimized media resource connection between the access realm 310 and the peering realm 315.

Optimization of the media gateway 305 is performed as part of a session description protocol (SDP) offer/answer message exchange that is used to establish a media path from the access realm 310 to the peering realm 315. In some embodiments, the optimization according to OMR procedures proceeds using the following steps:

1. Media gateways controlled by a session border controller (SBC) are provisioned at a network boundary to serve both untrusted access network realm and an untrusted peering network realm. In some embodiments, the gateways are instantiated with the same transcoding capabilities to support interactions that require transcoding between different codecs used in the different realms.
2. To create a context at the last node in the media path upon receiving an SDP offer, a proxy call session control function/interconnection border control function (P-CSCF/IBCF) replaces the realm of incoming side of the SDP offer (e.g., core network realm of terminating P-CSCF or outgoing IBCF) with the realm of the incoming side of the first node (e.g. access realm 310 of originating P-CSCF) in the media path before forwarding the SDP offer with OMR-specific SDP attributes. Some embodiments provide support for interactions with transcoding, in which case the P-CSCF/IBCF derives the codecs inserted by previous node from standard OMR-codec attribute and treats those codecs as if inserted by itself when handling the SDP offer thus to take over the responsibility for transcoding.
3. When an SDP answer is received from the far end, other than standard OMR procedures, the node that performed realm replacement as described in step 2 inserts an indicator to inform other nodes that realm replacement has been invoked. In embodiments that support transcoding, the indicator also invokes transcoding.
4. The node receives the SDP answer with that specific indicator, removes the H.248 context created or deallocates the gateway allocated while processing the SDP offer.

In the illustrated embodiment, media gateway 305 is controlled by a single SBC 345 that provisions the media gateway 305 at the network boundary to serve the access realm 310 and the peering realm 315. In some embodiments, the media gateway 305 supports interactions that include transcoding between different codecs used in the access realm 310 and the peering realm 315, in which case the contexts 320, 321 in the media gateway 305 are configured with the same transcoding capabilities. The first context 320 is instantiated in response to an SDP offer received from the access realm 310 and the first context 320 then generates an SDP offer that causes the media gateway 305 to instantiate the second context 321. The SDP offer/answer exchange disclosed above causes the gateway 305 to de-allocate the first context 320 and the associated termination points 325, 326, as indicated by the dotted lines in the second, optimized state 340. The termination point 331 in the second context 321 therefore functions as a sink for incoming media flows from the access realm 310 and a source for outgoing media flows to the access realm 310, thereby bypassing the first context 320.

Figure 4:
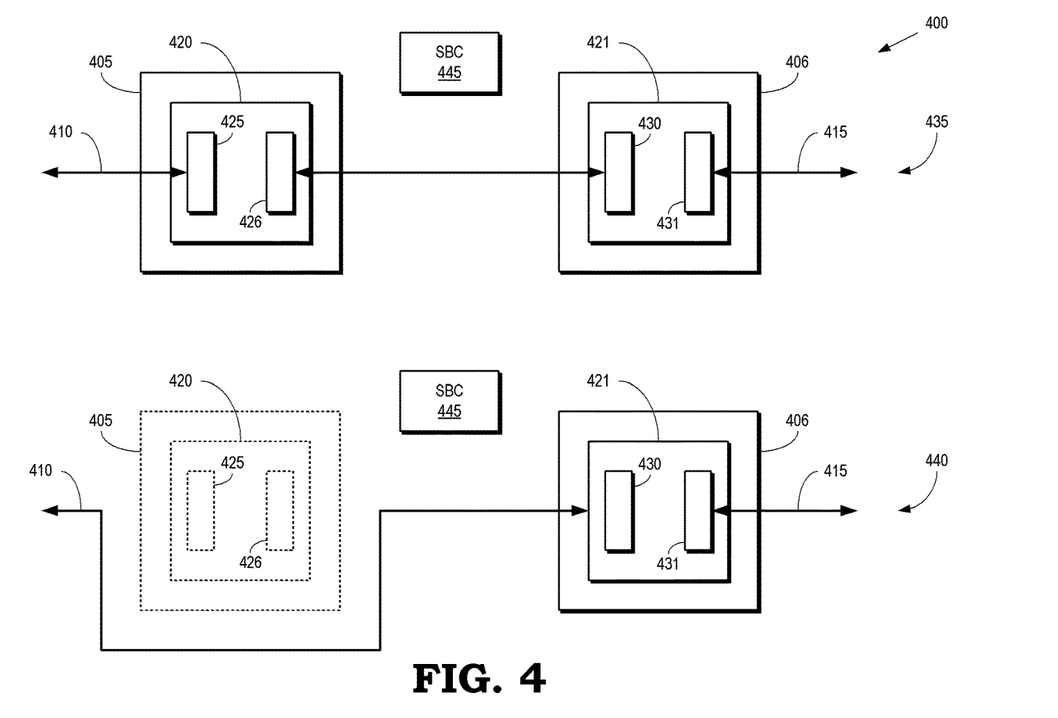
FIG. 4 is a block diagram of a media resource optimization implemented in two media gateways according to some embodiments.

FIG. 4 is a block diagram of a media resource optimization 400 implemented in two media gateways 405, 406 according to some embodiments. The media resource optimization 400 is implemented in some embodiments of the communication system 100 shown in FIG. 1 and the communication system 200 shown in FIG. 2. The media gateways 405, 406 provide interworking functionality between an untrusted access realm (as indicated by the double-headed arrow 410) and an untrusted peering realm (as indicated by the double-headed arrow 415). As discussed herein, the interworking functionality includes network address translation for messages exchanged between the access realm 410 and the peering realm 415 and, in some cases, transcoding between different codecs utilized in the access realm 410 and the peering realm 415.

The media gateway 405 implements a first context 420 associated with the access realm 410 and the media gateway 406 implements a second context 421 associated with the peering realm 415. The first context 420 includes termination points 425, 426, which function as sources of outgoing media flows from the first context 420 and sinks of incoming media flows to the first context 420. Some embodiments of the first context 420 operate according to the H.248 gateway control protocol that is used to provide communication services across a converged network such as the Internet. The second context 421 includes termination points 430, 431 that function as sources/sinks for media flows outgoing/incoming media flows for the second context 421.

The media resource optimization 400 illustrated in FIG. 4 depicts the media gateways 405, 406 in a first, unoptimized state 435 and a second, optimized state 440. In the unoptimized state 435, the termination point 425 in the first context 420 of the first gateway 405 terminates incoming and outgoing media flows associated with the access realm 410. The termination point 431 in the second context 421 of the second gateway 405 terminates incoming and outgoing media flows associated with the peering realm 415. The termination points 426, 430 (in the first context 420 of the first gateway 405 and the second context 421 of the second gateway 406, respectively) terminate media flows between the first context 420 and the second context 421 to complete the unoptimized media resource connection between the access realm 410 and the peering realm 415.

Optimization of the media gateways 405, 406 is performed as part of an SDP offer/answer message exchange that is used to establish a media path from the access realm 410 to the peering realm 415, e.g., according to the process discussed above with regard to FIG. 3. In the illustrated embodiment, media gateways 405, 406 are controlled by a single SBC 445 that provisions the media gateways 405, 406 at the network boundary to serve the access realm 410 and the peering realm 415. Another embodiment involves two SBCs, one controlling each media gateway. In some embodiments, the media gateways 405, 406 support interworking functions that include transcoding between different codecs used in the access realm 410 and the peering realm 415, in which case the contexts 420, 421 in the media gateways 405, 406, respectively, are configured with the same (or compatible) transcoding capabilities. The first context 420 is instantiated in response to an SDP offer received from the access realm 410 and the first context 420 then generates an SDP offer that is transmitted to the second gateway 406. In response to receiving the SDP offer, the second context 421 inserts an indicator to inform the context 420 that realm replacement had been invoked. The second gateway 406 response to the SDP offer by transmitting an SDP answer including the indicator and an identifier of the access realm 410. In embodiments that support transcoding, the indicator also invokes transcoding.

The SDP offer/answer exchange disclosed above causes the gateway 405 to de-allocate the first context 420 and the associated termination points 425, 426, as indicated by the dotted lines in the second, optimized state 440. In some embodiments, the first gateway 405 is also de-allocated, as indicated by the dotted lines in the second, optimized state 440. The termination point 430 in the second context 421 therefore functions as a sink for incoming media flows from the access realm 410 and a source for outgoing media flows to the access realm 410, thereby bypassing the first context 420 in the first gateway 405.

Figure 5:
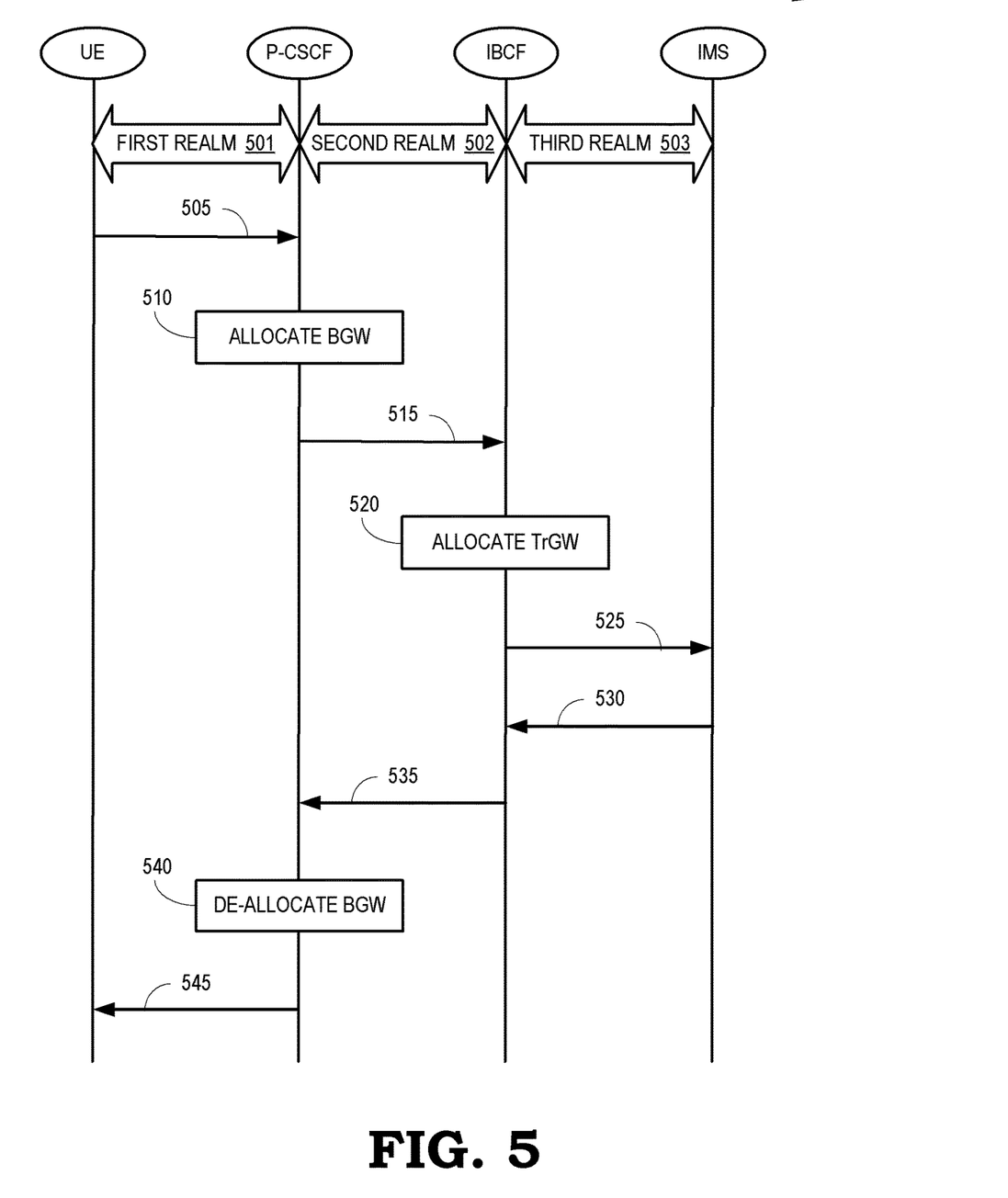
FIG. 5 is a signaling flow that is used to allocate gateways between a first realm, a second realm, and a third realm and then de-allocate a gateway between the first realm and the second realm according to some embodiments.

FIG. 5 is a signaling flow 500 that is used to allocate gateways between a first realm 501, a second realm 502, and a third realm 503 and then de-allocate a gateway between the first realm 501 and the second realm 502 according to some embodiments. The signaling flow 500 shows messages exchanged by a user equipment (UE), a P-CSCF, an IBCF, and an IMS network, as well as actions performed by these entities. The signaling flow 500 is performed in some embodiments of the communication system 100 shown in FIG. 1 and the communication system 200 shown in FIG. 2, and represents an implementation of some embodiments of the media resource optimization 300 shown in FIG. 3 and the media resource optimization 400 shown in FIG. 4. In some embodiments, the messages are session initiation protocol (SIP) messages that are used to perform an SDP offer/answer negotiation.

The UE transmits an invite message 505 to the P-CSCF. The invite message includes an SDP offer and an identifier of the UE. For example, the UE can transmit the following SIP invite message:

```
INVITE SIP: user_B@operator_Y.net; SIP/2.0
SIP headers according to 3GPP TS 24.229
Content-Type: application/sdp
Content-Length: (...)
v=0
o=— 2987933615 2987933615 IN IP4 192.0.2.1
s=
t=0 0
c=IN IP4 192.0.2.1
m=audio 49170 RTP/AVP 96 97
a=curr:qos local none
a=curr:qos remote none
a=des:qos mandatory local sendrecv
a=des:qos none remote sendrecv
a=rtpmap:97 AMR
a=fmtp:97 mode-set=0,2,5,7; mode-change-period=2
a=rtpmap:96 telephone-event
a=maxptime:20
```

In some embodiments, the invite message 505 indicates a codec used in the first realm 501, such as information indicating the AMR codec.

In response to receiving the invite message 505, the P-CSCF determines that the incoming realm (the first realm 501) is different than the outgoing realm (the second realm 502). The P-CSCF therefore allocates (at block 510) a border gateway (BGW) to provide interworking functionality between the first realm 501 and the second realm 502.

The P-CSCF also inserts visited-realm and other OMR-specific attributes into the SDP offer and forwards the modified SDP offer to the IBCF in an invite message 515. For example, the P-CSCF can transmit the following SIP invite message:

```
INVITE SIP: user_B@operator_Y.net; SIP/2.0
SIP headers according to 3GPP TS 24.229
Content-Type: application/sdp
Content-Length: (...)
v=0
o=— 2987933615 2987933615 IN IP4 192.0.2.1
s=
t=0 0
c=IN IP4 13.24.1.1
m=audio 62111 RTP/AVP 96 97
a=curr:qos local none
a=curr:qos remote none
a=des:qos mandatory local sendrecv
a=des:qos none remote sendrecv
a=rtpmap:97 AMR
a=fmtp:97 mode-set=0,2,5,7; mode-change-period=2
a=rtpmap:96 telephone-event
a=maxptime:20
a=visited-realm:1 X IN IP4 192.0.2.1 49170
a=visited-realm:2 Y IN IP4 13.24.1.1 62111
a=omr-m-cksum:(..)
a=omr-s-cksum:0
```

In some embodiments, the invite message 515 includes information indicating codecs that are used in the first realm 501 and the second realm 502. For example, the invite message 515 can include information indicating the AMR, Opus, G.722 codecs.

In response to receiving the invite message 515, the IBCF determines that the incoming realm (the second realm 502) is different than the outgoing realm (the third realm 503). The IBCF therefore allocates (at block 520) a transit gateway (TrGW). However, instead of allocating a transit gateway to support interworking between the second realm 502 and the third realm 503, the IBCF allocates a transit gateway for interworking between the first realm 501 and the third realm 503. In subsequent messages, the first realm 501 is specified by the visited-realm attribute and an instance identifier having a value of "1." Thus, the IBCF allocates the transit gateway as if the visited realm attribute in the invite message 515 only indicated the first realm 501 and did not indicate the second realm 502.

The IBCF generates an invite message 525 and transmits the invite message 525 to the intermediate IMS network. As discussed above, the invite message 525 includes visited-realm attributes that indicate the first realm 501 and the third realm 503. For example, the IBCF can transmit the following SIP invite message:

INVITE SIP: sip:UE-B@operatorX.net; SIP/2.0
SIP headers according to 3GPP TS 24.229
Content-Type: application/sdp
Content-Length: ( . . . )
v=0
o=−2987933615 2987933615 IN IP4 192.0.2.1
s=
t=0 0
c=IN IP4 190.1.15.2
m=audio 11324 RTP/AVP 96 97
a=curr:gos local none
a=curr:gos remote none
a=des:gos mandatory local sendrecv
a=des:gos none remote sendrecv
a=rtpmap:97 AMR
a=fmtp:97 mode-set=0,2,5,7; mode-change-period=2
a=rtpmap:96 telephone-event
a=maxptime:20
a=visited-realm:1 X IN IP4 192.0.2.1 49170
a=visited-realm:2 Z IN IP4 190.1.15.2 11324
a=omr-m-cksum:( . . . )
a=omr-s-cksum:0

In some embodiments, the IBCF inserts information identifying codecs used in the first realm 501, the second realm 502, and the third realm 503. For example, the invite message 525 can include information identifying the AMR, Opus, G.722, and AMR-WB codecs.

In response to receiving the invite message 525, the intermediate IMS network responds with an acknowledgment message 530. In some embodiments, the acknowledgment message 530 is a 183 Session Progress response containing an initial SDP answer. For example, the intermediate IMS network can transmit the following acknowledgment message:

SIP/2.0 183 Session Progress
SIP headers according to 3GPP TS 24.229
Content-Type: application/sdp
Content-Length: (...)
v=0
o=− 2987933615 2987933615 IN IP4 192.0.2.1
s=−
c=IN IP4 192.0.2.4
t=0 0
m=audio 16511 RTP/AVP 97 98
a=curr:qos local none
a=curr:qos remote sendrecv
a=des:qos mandatory local sendrecv
a=des:qos none remote sendrecv
a=rtpmap:98 AMR -continued a=fmtp:98 mode-set=0,2,5,7; mode-change-period=2
a=rtpmap:97 telephone-event
a=maxptime:20

In response to receiving the acknowledgment message 530, the IBCF updates the local transit gateway based on information included in the acknowledgment message 530. Some embodiments of the IBCF update values of a remote IP address/port, a codec, and the like based on the received information. In some embodiments, transcoding is invoked at the transit gateway if the acknowledgment message 530 indicates that different codecs are used in the first realm 501 and the third realm 503. For example, transcoding is invoked if the acknowledgment message 530 transmitted by the IMS network indicates that AMR-WB is the codec for the third realm 503. No transcoding is required if the IMS network indicates that AMR is the codec used in the third realm 503.

Since realm replacement was performed by the IBCF in response to receiving the invite message 515, the IBCF generates an answer message 535 including information indicating the visited-realm attribute for the first realm 501 and an instance identifier "1." In some embodiments, the answer message 535 is an SDP answer message that includes the visited-realm attributes, the instance number, and an unspecified IP address to inform the P-CSCF that the IBCF supports the first realm 501. The IBCF then transmits the answer message 535 to the P-CSCF. For example, the IBCF can transmit the following message to the P-CSCF:

SIP/2.0 183 Session Progress
SIP headers according to 3GPP TS 24.229
Content-Type: application/sdp
Content-Length: (...)
v=0
o=− 2987933615 2987933615 IN IP4 192.0.2.1
s=−
c=IN IP4 190.1.15.1
t=0 0
m=audio 18435 RTP/AVP 97 98
a=curr:qos local none
a=curr:qos remote sendrecv
a=des:qos mandatory local sendrecv
a=des:qos none remote sendrecv
a=rtpmap:98 AMR
a=fmtp:98 mode-set=0,2,5,7; mode-change-period=2
a=rtpmap:97 telephone-event
a=maxptime:20
a=visited-realm:1 X IN IP4 0.0.0.0 49170
a=omr-m-cksum:(..)
a=omr-s-cksum:0

The P-CSCF detects the visited-realm attribute indicating the first realm 501 in the answer message 535 and determines that this is the same as the incoming realm for the P-CSCF. Thus, the P-CSCF determines that the IBCF can support the first realm 501. Instead of updating the local border gateway according to conventional OMR procedures, the P-CSCF de-allocates (at block 540) the border gateway that was previously allocated in response to the SDP offer 505.

The P-CSCF generates an answer message 545 that is transmitted to the UE. In some embodiments, the P-CSCF removes the received visited-realm attribute from the answer message 535 to generate answer message 545, which is then forwarded to the UE. For example, the P-CSCF can transmit the following message to the UE:

```
SIP/2.0 183 Session Progress
SIP headers according to 3GPP TS 24.229
Content-Type: application/sdp
Content-Length: (...)
v=0
o=- 2987933615 2987933615 IN IP4 192.0.2.1
s=-
c=IN IP4 190.1.15.1
t=0 0
m=audio 18435 RTP/AVP 97 98
a=curr:qos local none
a=curr:qos remote sendrecv
a=des:qos mandatory local sendrecv
a=des:qos none remote sendrecv
a=rtpmap:98 AMR
a=fmtp:98 mode-set=0,2,5,7; mode-change-period=2
a=rtpmap:97 telephone-event
a=maxptime:20
```

The signaling flow 500 therefore causes the border gateway to be bypassed (e.g., by subsequently de-allocating the previously allocated border gateway) so that a single transit gateway is used to support the media path between the first realm 501 and the third realm 503. A similar signaling flow is used when the border gateway and the transit gateway are co-located in the same physical gateway (e.g., as shown in FIG. 3) except that the IBCF creates a new context on the single gateway instead of allocating a new gateway and the P-CSCF removes the context that it created instead of de-allocating the gateway.

Figure 6:
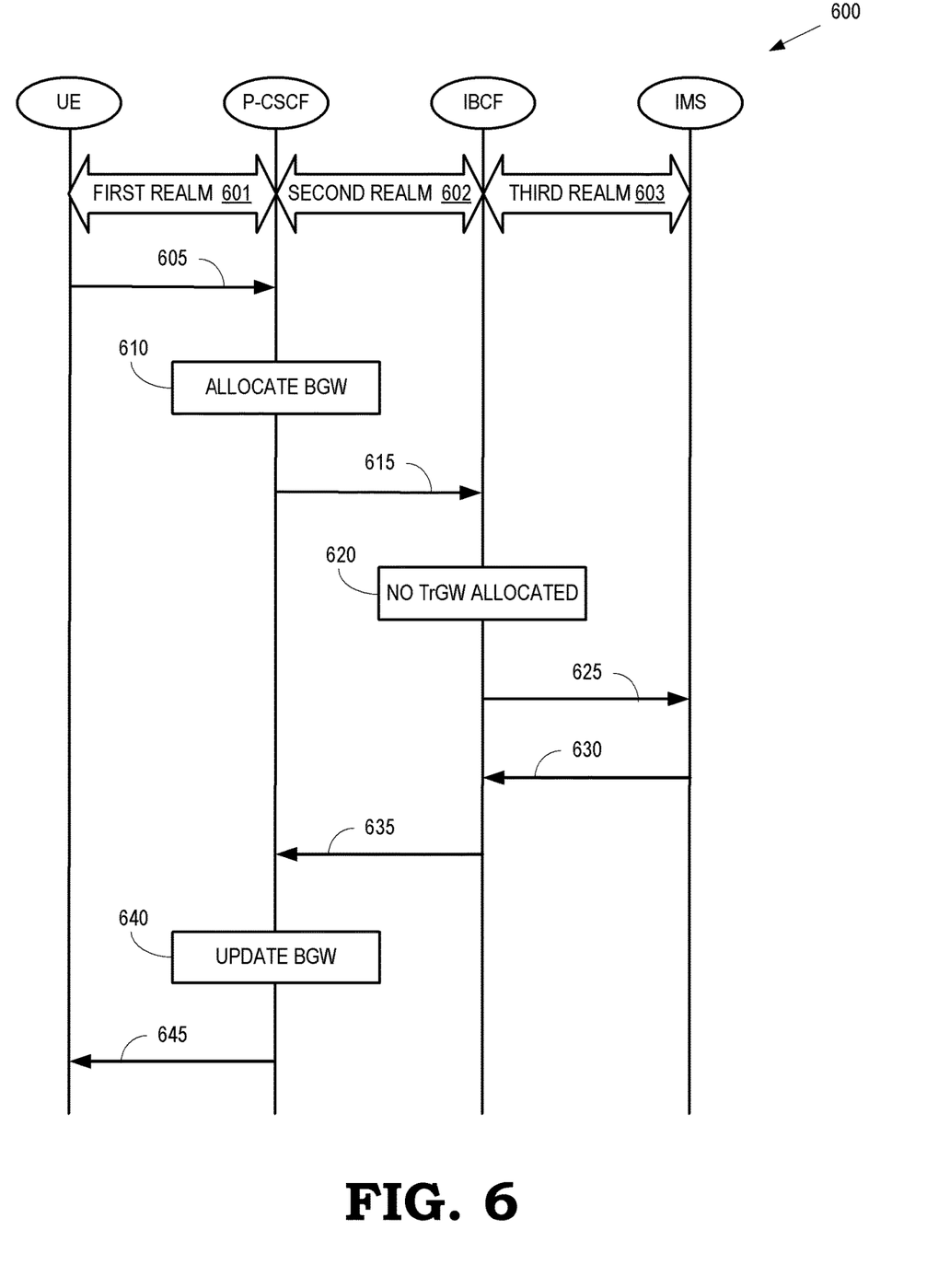
FIG. 6 is a signaling flow that is used to allocate a border gateway between a first realm and a second realm while bypassing allocation of a transit gateway between the second realm and a third realm according to some embodiments.

FIG. 6 is a signaling flow 600 that is used to allocate a border gateway between a first realm 601 and a second realm 602 while bypassing allocation of a transit gateway between the second realm 602 and a third realm 603 according to some embodiments. The signaling flow 600 shows messages exchanged by a user equipment (UE), a P-CSCF, an IBCF, and an IMS network, as well as actions performed by these entities. The signaling flow 600 is performed in some embodiments of the communication system 100 shown in FIG. 1 and the communication system 200 shown in FIG. 2, and represents an implementation of some embodiments of the media resource optimization 300 shown in FIG. 3 and the media resource optimization 400 shown in FIG. 4. In some embodiments, the messages are session initiation protocol (SIP) messages that are used to perform an SDP offer/answer negotiation.

The UE transmits an invite message 605 to the P-CSCF. The invite message includes an SDP offer and an identifier of the UE, as discussed above with regard to the signaling flow 500 shown in FIG. 5. In response to receiving the invite message 605, the P-CSCF determines that the incoming realm (the first realm 601) is different than the outgoing realm (the second realm 602). The P-CSCF therefore allocates (at block 610) a border gateway (BGW) to provide interworking functionality between the first realm 601 and the second realm 602. The P-CSCF also inserts visited-realm and other OMR-specific attributes into the SDP offer and forwards the modified SDP offer to the IBCF in an invite message 615.

In the illustrated embodiment, the media flow is anchored on the incoming side. A trigger is therefore provided to indicate that the media flow should not be anchored on the outgoing side. Examples of the trigger include, but are not limited to, a static configuration flag and the detection of a dynamic indicator in a SIP request. The IBCF is therefore aware of the requirement that the media flow be anchored on the incoming side. Based on the trigger indicating that the media flow is anchored on the incoming side, the IBCF bypasses (at block 620) allocation of a transit gateway. The IBCF generates an invite message 625 and transmits the invite message 625 to the intermediate IMS network. As discussed above, the invite message 625 includes visited-realm attributes that indicate the first realm 601 and the third realm 603.

In response to receiving the invite message 625, the intermediate IMS network responds with an acknowledgment message 630. In some embodiments, the acknowledgment message 630 is a 183 Session Progress response containing an initial SDP answer and an instance identifier that is equal to a value of a highest instance identifier in a received SDP offer plus one.

In response to receiving the acknowledgment message 630, the IBCF generates an answer message 635 including information indicating the visited-realm attribute for the third realm 603. Since the indication of the third realm 603 was not included in the original outgoing SDP offer in the message 615, the P-CSCF updates (at block 640) the border gateway based on the information included in the answer message 635.

The P-CSCF generates an answer message 645 that is transmitted to the UE. In some embodiments, an indication of the border gateway is included in the answer message 645, which is then forwarded to the UE.

Figure 7:
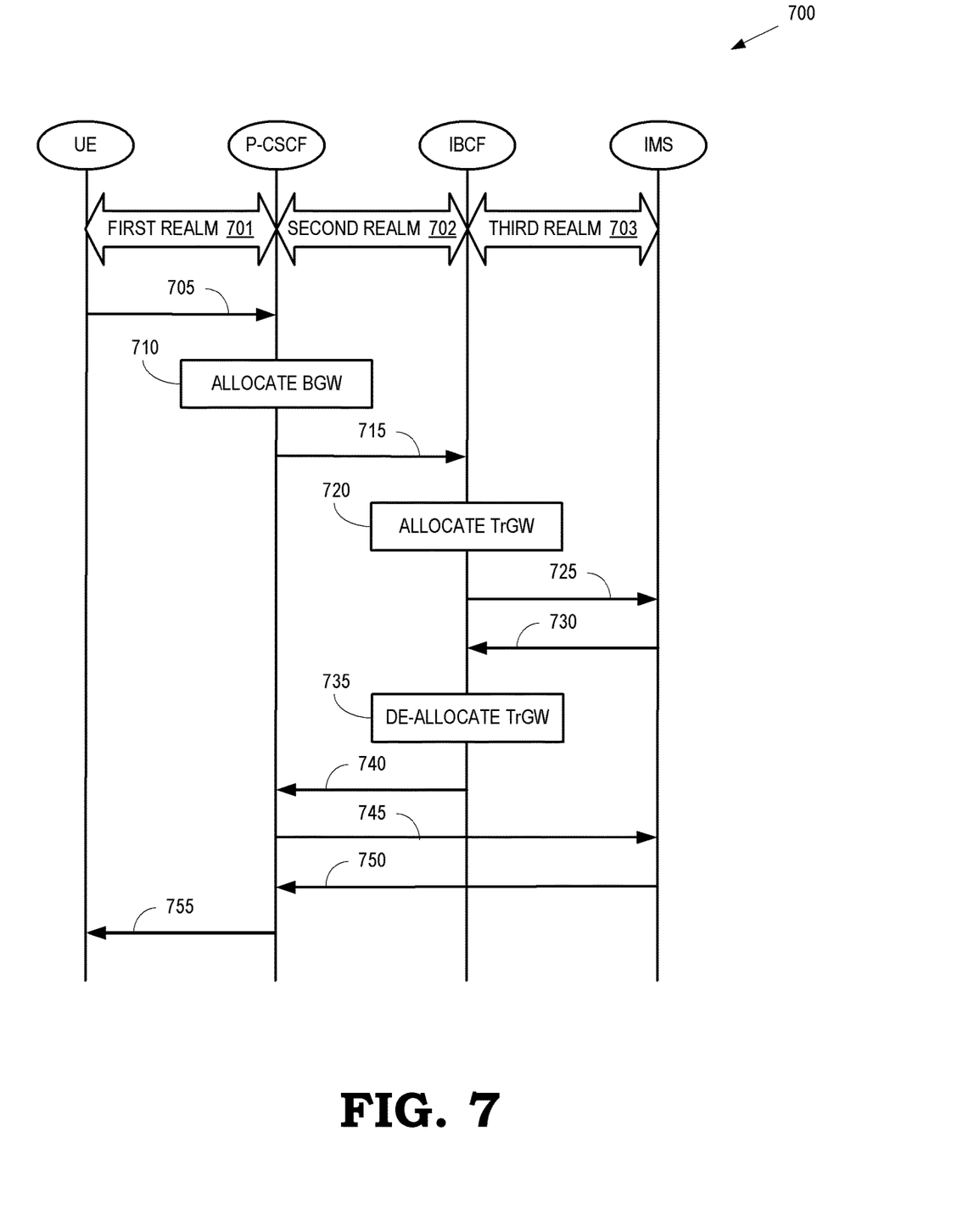
FIG. 7 is a signaling flow that is used to allocate gateways between a first realm, a second realm, and a third realm and subsequently de-allocating the gateway between the second realm and the third realm according to some embodiments.

FIG. 7 is a signaling flow 700 that is used to allocate gateways between a first realm 701, a second realm 702, and a third realm 703 and subsequently de-allocating the gateway between the second realm 702 and the third realm 703 according to some embodiments. The signaling flow 700 shows messages exchanged by a user equipment (UE), a P-CSCF, an IBCF, and an IMS network, as well as actions performed by these entities. The signaling flow 700 is performed in some embodiments of the communication system 100 shown in FIG. 1 and the communication system 200 shown in FIG. 2, and represents an implementation of some embodiments of the media resource optimization 300 shown in FIG. 3 and the media resource optimization 400 shown in FIG. 4. In some embodiments, the messages are session initiation protocol (SIP) messages that are used to perform an SDP offer/answer negotiation.

The UE transmits an invite message 705 to the P-CSCF. The invite message includes an SDP offer and an identifier of the UE, as discussed above with regard to the signaling flow 500 shown in FIG. 5. The invite message 705 also includes information indicating a codec used in the first realm 701, e.g., the G.722 codec.

In response to receiving the invite message 705, the P-CSCF determines that the incoming realm (the first realm 701) is different than the outgoing realm (the second realm 702). The P-CSCF therefore allocates (at block 710) a border gateway (BGW) to provide interworking functionality between the first realm 701 and the second realm 702. The P-CSCF also inserts visited-realm and other OMR-specific attributes into the SDP offer and forwards the modified SDP offer to the IBCF in an invite message 715. In some embodiments, the invite message 715 includes information indicating codecs used in the first realm 701 and the second realm 702, e.g., the G.722, AMR, and Opus codecs.

In the illustrated embodiment, the media flow is anchored on the incoming side. A trigger is therefore provided to indicate that the media flow should not be anchored on the outgoing side. Examples of the trigger include, but are not limited to, a static configuration flag and the detection of a dynamic indicator in a SIP request. The IBCF is therefore aware of the requirement that the media flow be anchored on the incoming side. Based on the trigger indicating that the media flow is anchored on the incoming side, the IBCF allocates (at block 720) a transit gateway having an ingress realm equal to the second realm 702 and an egress realm equal to the third realm 703.

The IBCF generates an invite message 725 that includes visited-realm attributes that indicate the second realm 702 and the third realm 703. The invite message 725 also includes information indicating codecs used in the first realm 701, the second realm 702, and the third realm 703, e.g., the G.722, AMR, and Opus codecs. The invite message 725 is then transmitted to the intermediate IMS network.

In response to receiving the invite message 725, the intermediate IMS network responds with an acknowledgment message 730. In some embodiments, the acknowledgment message 730 is a 183 Session Progress response containing an initial SDP answer and an indicator of a codec used by the intermediate IMS network, e.g., the G.722 codec.

In response to receiving the acknowledgment message 730, the IBCF determines that transcoding is not needed because the codec indicated in the acknowledgment message 730 is the same as the codec indicated in the invite message 705 transmitted by the user equipment, e.g., the G.722 codec. The IBCF therefore de-allocates (at block 735) the transit gateway. The IBCF generates an answer message 740 including information indicating the visited-realm attribute for the third realm 703. The answer message 740 also includes an instance number of "1" and an unspecified IP.

The P-CSCF receives the answer message 740 that indicates the third realm 703, as well as including the instance number of "1" and the unspecified IP. Based on this information, the P-CSCF determines that the third realm 703 is different than the realms indicated in the SDP offer that was included in previous outgoing invite message 715. The P-CSCF therefore transmits an update message 745 to the IMS network (via the IBCF). The update message 745 includes an SDP offer and visited-realm attributes that indicate the first realm 701 and the third realm 703.

The IMS network responds to the update message 745 by transmitting an OK message 750 (via the IBCF) that includes an SDP answer, which also indicates the codec G.722. In response to the OK message 750, the P-CSCF generates an answer message 755 that is transmitted to the UE. In some embodiments, the answer message 755 includes an SDP answer, an indication of the border gateway, and the codec G.722.

Figure 8:
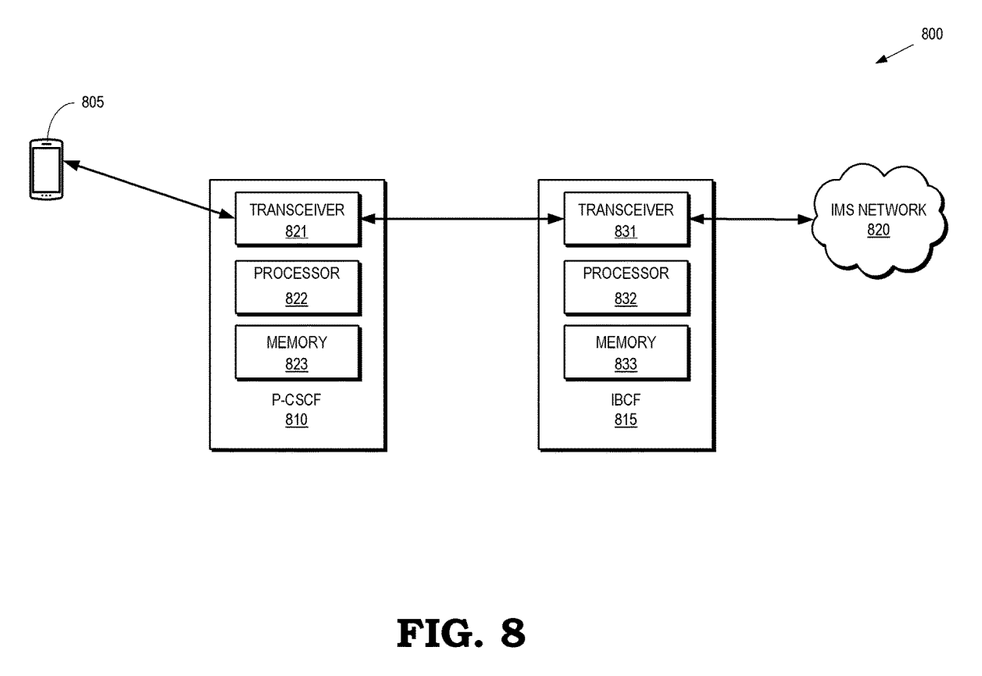
FIG. 8 is a block diagram of a communication system that supports OMR between different realms according to some embodiments.

FIG. 8 is a block diagram of a communication system 800 that supports optimized media routing between different realms according to some embodiments. The communication system 800 includes a user equipment 805, a P-CSCF 810, an IBCF 815, and an IMS network 820. The communication system 800 therefore represents some embodiments of the communication system 100 shown in FIG. 1 and the communication system 200 shown in FIG. 2.

The P-CSCF 810 includes a transceiver 821 for transmitting and receiving signals, e.g. exchanging signals with the user equipment 805 or the IBCF 815. The transceiver 821 can be implemented as a single integrated circuit (e.g., using a single ASIC or FPGA) or as a system-on-a-chip (SOC) that includes different modules for implementing the functionality of the transceiver 821. The P-CSCF 810 also includes a processor 822 and a memory 823. The processor 822 is used to execute instructions stored in the memory 823 and to store information in the memory 823 such as the results of the executed instructions. The P-CSCF 810 is therefore able to implement some embodiments of the signaling flow 500 shown in FIG. 5, the signaling flow 600 shown in FIG. 6, and the signaling flow 700 shown in FIG. 7.

The IBCF 815 includes a transceiver 831 for transmitting and receiving signals, e.g. exchanging signals with the user equipment 805 or the P-CSCF 810. The transceiver 831 can be implemented as a single integrated circuit (e.g., using a single ASIC or FPGA) or as a system-on-a-chip (SOC) that includes different modules for implementing the functionality of the transceiver 831. The IBCF 815 also includes a processor 832 and a memory 833. The processor 832 is used to execute instructions stored in the memory 833 and to store information in the memory 833 such as the results of the executed instructions. The IBCF 815 is therefore able to implement some embodiments of the signaling flow 500 shown in FIG. 5, the signaling flow 600 shown in FIG. 6, and the signaling flow 700 shown in FIG. 7.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

As used herein, the term "circuitry" may refer to one or more or all of the following:
  (a) hardware-only circuit implementations (such as implementations and only analog and/or digital circuitry) and
  (b) combinations of hardware circuits and software, such as (as applicable):
    (i) a combination of analog and/or digital hardware circuit(s) with software/firmware and
    (ii) any portions of a hardware processor(s) with software (including digital signal processor(s), software, and memory(ies) that work together to cause an apparatus, such as a mobile phone or server, to perform various functions) and
  (c) hardware circuit(s) and/or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in a server, a cellular network device, or other computing or network device.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. An apparatus comprising:
   a transceiver configured to support a media flow involving a user equipment and an Internet Protocol (IP) Multimedia Subsystem (IMS) network that are connected via a media path that traverses a first realm associated with the user equipment, a second realm, and a third realm associated with the IMS network; and
   a processor configured to bypass allocation of a first context to perform interworking between the second realm and the third realm in response to an indication that the media flow is anchored on an incoming side, and wherein a second context on the incoming side performs interworking between the first realm and the third realm.

2. The apparatus of claim 1, wherein the indication that the media flow is anchored on the incoming side comprises at least one of a static configuration flag or an indicator that is dynamically detected in a message received by the transceiver.

3. The apparatus of claim 1, wherein bypassing allocation of the first context comprises skipping allocation of the first context.

4. The apparatus of claim 3, wherein the processor is configured to generate a session description protocol (SDP) offer including visited-realm attributes that indicate the first realm and the third realm, and wherein the transceiver is configured to transmit the SDP offer towards the IMS network.

5. The apparatus of claim 4, wherein the processor is configured to generate an SDP answer including a visited-realm attribute that indicates the third realm.

6. The apparatus of claim 1, wherein bypassing allocation of the first context comprises allocating a first context having an ingress realm equal to the first realm and an egress realm equal to the second realm in response to receiving an SDP offer including visited-realm attributes that indicate the first realm and the second realm and subsequently de-allocating the first context in response to an SDP answer received from the IMS network.

7. The apparatus of claim 1, wherein the processor is configured to generate an SDP offer including information indicating the first realm, the third realm, and at least one codec, and wherein the processor is configured to determine whether transcoding is necessary based on an SDP answer received from the network in response to the SDP offer.

8. The apparatus of claim 1, wherein the interworking performed by the second context comprises address translation between the first realm and the third realm.

9. The apparatus of claim 1, wherein the processor is also configured to establish the second context.

10. A method, comprising:
    establishing a media path between a user equipment and an Internet Protocol (IP) Multimedia Subsystem (IMS) network, wherein the media path traverses a first realm associated with the user equipment, a second realm, and a third realm associated with the IMS network;
    selectively allocating one of a first context for interworking between the first realm and the second realm and a second context for interworking between the second realm and the third realm; and
    bypassing allocation of one of the first context and the second context so that only a single context performs interworking between the first realm and the third realm.

11. The method of claim 10, wherein selectively allocating and bypassing comprises:
    establishing the first context to perform interworking between the first realm and the second realm in response to an offer message from the user equipment; and
    subsequently de-allocating the first context in response to receiving an answer message indicating that a second context performs interworking between the first realm and the third realm.

12. The method of claim 10, wherein selectively allocating and bypassing comprises:
    bypassing allocation of the second context to perform interworking between the second realm and the third realm in response to an indication that the media flow is anchored on an incoming side.

13. The method of claim 12, wherein bypassing allocation of the first context comprises skipping allocation of the first context.

14. The method of claim 12, wherein bypassing allocation of the first context comprises:
- allocating the first context having an ingress realm equal to the first realm and an egress realm equal to the second realm in response to receiving an SDP offer including visited-realm attributes that indicate the first realm and the second realm; and
- subsequently de-allocating the first context in response to an SDP answer received from the IMS network.

15. The method of claim 11, wherein establishing the first context comprises establishing the first context on a first gateway, and wherein establishing the second context comprises establishing the second context on a second gateway.

16. The method of claim 11, wherein establishing the first context comprises establishing the first context on a first gateway, and wherein establishing the second context comprises establishing the second context on the first gateway.

17. A non-transitory computer readable storage medium, having stored therein one or more sets of executable instructions and certain data that, when executed by one or more processors, manipulate the one or more processors to perform:
- establishing a media path between a user equipment and an Internet Protocol (IP) Multimedia Subsystem (IMS) network, wherein the media path traverses a first realm associated with the user equipment, a second realm, and a third realm associated with the IMS network;
- selectively allocating one of a first context for interworking between the first realm and the second realm and a second context for interworking between the second realm and the third realm; and
- bypassing allocation of one of the first context and the second context so that only a single context performs interworking between the first realm and the third realm.

* * * * *